United States Patent
Bhatt et al.

(10) Patent No.: US 7,670,417 B2
(45) Date of Patent: Mar. 2, 2010

(54) COMPOSITE COLOR AND METHOD OF MAKING THE SAME

(75) Inventors: Jayprakash C. Bhatt, Corvallis, OR (US); Cory J. Ruud, Corvallis, OR (US); Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 11/497,827

(22) Filed: Aug. 2, 2006

(65) Prior Publication Data

US 2008/0030561 A1 Feb. 7, 2008

(51) Int. Cl.
*C09D 11/00* (2006.01)
*G01D 11/00* (2006.01)

(52) U.S. Cl. ..................... 106/31.6; 347/100
(58) Field of Classification Search ................ 106/31.6; 347/100

See application file for complete search history.

(56) References Cited

U.S. PATENT DOCUMENTS

| | | | |
|---|---|---|---|
| 5,198,023 A | | 3/1993 | Stoffel |
| 5,801,738 A | | 9/1998 | Stoffel et al. |
| 6,022,908 A | * | 2/2000 | Ma et al. ................... 523/160 |
| 6,342,095 B1 | * | 1/2002 | Takizawa et al. ......... 106/31.27 |
| 6,386,695 B1 | | 5/2002 | Kowalski |
| 6,387,168 B1 | | 5/2002 | Koitabashi et al. |
| 6,536,891 B2 | | 3/2003 | Oyanagi |
| 6,652,084 B1 | | 11/2003 | Teraoka et al. |
| 6,805,736 B2 | | 10/2004 | Wickramanayake |
| 6,814,793 B2 | | 11/2004 | Akers et al. |
| 6,864,302 B2 | | 3/2005 | Miyabayashi |
| 6,979,365 B2 | * | 12/2005 | Tsuru et al. ................. 106/31.6 |
| 7,270,699 B2 | * | 9/2007 | Doi ......................... 106/31.27 |
| 2002/0077385 A1 | | 6/2002 | Miyabayashi |
| 2004/0168608 A1 | * | 9/2004 | Bauer et al. ............... 106/31.27 |
| 2006/0092252 A1 | * | 5/2006 | Wickramanayake ........ 347/100 |

FOREIGN PATENT DOCUMENTS

| | | | |
|---|---|---|---|
| EP | 0 952 195 A | | 10/1999 |
| EP | 1 186 639 A | | 3/2002 |
| EP | 1652896 A2 | * | 5/2006 |
| WO | WO 2004/046266 | | 6/2004 |
| WO | 2006/065902 A | | 6/2006 |

* cited by examiner

*Primary Examiner*—Jerry Lorengo
*Assistant Examiner*—Veronica Faison Gee

(57) ABSTRACT

A composite color includes a first colored ink and a second colored ink. The first colored ink exhibits a color that is different from that exhibited by the second colored ink. The first colored ink includes pigment particles either formulated at a basic pH so that a surface of the pigment particles carries a net negative charge or formulated at an acidic pH so that a surface of the pigment particles carries a net positive charge; and the second colored ink includes pigment particles either formulated at an acidic pH so that a surface of each of the pigment particles carries a net positive charge or formulated at a basic pH so that a surface of the pigment particles carries a net negative charge. The first colored ink and the second colored ink have opposite charges. The composite color exhibits enhanced color richness when printed on a substrate.

17 Claims, No Drawings

COMPOSITE COLOR AND METHOD OF MAKING THE SAME

BACKGROUND

The present disclosure relates generally to composite colors and methods of making the same.

Pigment-based inks generally exhibit good permanence properties and good water fastness properties. These inks may, when printed on some substrates, exhibit poor richness of color. Color richness may be especially difficult to achieve when two different colored inks are used to form a composite color. Efforts to increase the color richness of composite colors have included, for example, decreasing or increasing the amount of fixer ink printed when forming the composite color, and printing the composite color on specially coated papers. Fixer inks may, however, increase the cost associated with printing and may require additional pen nozzles. Specially coated papers may also increase the cost associated with printing.

DETAILED DESCRIPTION

Embodiments of the composite colors disclosed herein have increased color richness when printed on a variety of media, including, but not limited to plain paper, photo paper, polymeric materials, or the like. The composite colors advantageously combine a negatively charged colored ink and a positively charged colored ink. The oppositely charged inks are compatible, and it is believed that such compatibility aids in substantially increasing the color richness of the formed composite color. As used herein, richness of color or saturation is defined by $C^*/L^*$, where $C^*$ is chroma, and $L^*$ is the lightness value measured in CIELAB color space. In an embodiment, the color richness of the printed composite color is greater than about 0.85, or is enhanced by about 0.1 to about 0.4 when compared to a composite color formed with inks having the same charge. In other embodiments, the color richness and/or saturation of the composite color is enhanced by about 5% to about 50%, or the color richness and/or saturation is enhanced by about 10% to about 50% over a composite color formed with inks having the same charge.

The composite color of the present disclosure includes a first colored ink and a second colored ink. The first colored ink generally includes pigment particles formulated at a basic pH or an acidic pH so that a surface of each of the pigment particles carries a net negative charge or a net positive charge, respectively. The second colored ink includes pigment particles formulated at the other of the acidic pH or the basic pH so that a surface of each of the pigment particles carries the other of the net positive charge and the net negative charge. It is to be understood either of the first or second colored inks may be formulated at the basic or acidic pH, as long as the first and second colored inks have opposite charges.

As previously stated, each of the first and second colored inks includes pigment particles. Non-limiting examples of such pigment particles include yellow pigments (e.g., PY74, PY218, or the like), magenta pigments (e.g., magenta PR122, PV19, or the like), or cyan pigments (e.g., PB15:3, PB15:4, or the like). Generally, the pigment particles may be self-dispersible, non self-dispersible, amphoteric, or combinations thereof.

Each of the two inks exhibits a color different from the other of the two inks; therefore, the first colored ink has different colored pigment particles than the second ink. It is to be understood that the different colored pigment particles include those particles having different colors and those particles having different hues of the same color. In an embodiment, neither of the inks exhibits a black color. Generally, each of the inks includes its respective pigment particles in an amount ranging from about 1.0 wt. % to about 10 wt. %. Alternatively, the pigment particles are present in an amount ranging from about 2.0 wt. % to about 8.0 wt. %, or from about 3.0 wt. % to about 6.0 wt. %.

The pigment particles within the first and second inks may be stabilized and/or dispersed by molecules (e.g., polymers or small molecules) having at least one group (i.e., functional group) that is capable of being ionized at high or low pH values so that it carries a desirable charge. As such, the pH at which the respective inks are formulated is dependent upon, at least in part, the pH at which the functional groups of the respective molecules are ionized. Examples of such small molecules include, but are not limited to benzoic acid, phthalic acid, benzenesulfonic acid, surfactants, or the like, or combinations thereof. In a non-limiting example, some Cab-O-Jet® dispersions (which are commercially available from Cabot Corp. located in Boston, Mass.) have benzenesulfonic acid groups that are capable of covalently attaching to the surface of the pigment particles. In another non-limiting example, various anionic or cationic surfactants are capable of dispersing the pigment particles.

The molecules may be associated with the surfaces of the respective pigment particles by covalent attachment or physical adsorption. Generally, the molecule to pigment particle ratio ranges from about 1:10 to about 3:1. In an embodiment, the molecule to pigment particle ratio ranges from about 2:10 to about 3:2. In still another embodiment, the molecule to pigment particle ratio ranges from about 2:10 to about 5:10.

Non-limiting examples of groups of the molecules that may be ionized at high pH (i.e., basic pH) include carboxylic acids, carbonic acids, carbamic acids, sulfonic acids, sulfinic acids, boronic acids, phosphoric acids, phosphonic acids, phenols, naphthols, and/or combinations thereof. Non-limiting examples of groups of the molecules that may be ionized at low pH (i.e., acidic pH) include primary amines, secondary amines, tertiary amines, imines, imidazoles, guanidines, nitrogen containing heterocycles, and/or combinations thereof. Generally, for functional groups that are ionized as their anions (e.g., carboxylic acid), the pH of the formulated ink is about 1 to 2 pH units higher than the pK of that functional group. Similarly, for functional groups that are ionized by protonation (e.g., amine groups), the pH of the formulated ink is about 1 to 2 pH units lower than the pK of that functional group.

It is to be understood that the molecules (and their respective functional groups) within the first and second inks may be substantially the same or different, as long as one ink is formulated to ionize its functional group(s) so the pigment particle surfaces carry a net positive charge, and the other ink is formulated to ionize its functional group(s) so the pigment particle surfaces carry a net negative charge. In a non-limiting example, the first and second inks may include pigment particles that are dispersed by polymers or small molecules that include both carboxylic acids and primary amine functional groups. The first ink is formulated at a basic pH so that the carboxyl groups are ionized in the carboxylate form, while the second ink is formulated at an acidic pH so that the amine groups are protonated in the ammonium salt form. In another non-limiting example, the first ink includes pigment particles that are dispersed by molecules having carboxylic acid functional groups, and the second ink includes pigment particles that are dispersed by molecules having primary amine functional groups.

The pigment and molecules of first and second colored inks are included in an ink vehicle. "Liquid vehicle" or "ink vehicle," as used herein, refers to the vehicle in which colorant is placed to form an ink. A wide variety of ink vehicles may be used with the compositions, systems, and methods according to embodiments disclosed herein. Suitable ink vehicle components may include, but are not limited to surfactants, solvents, co-solvents, buffers, biocides (a non-limiting example of which is commercially available under the tradename PROXEL GXL (a solution of 1,2-benzisothiazolin-3-one (BIT), sodium hydroxide, and dipropylene glycol) from Avecia Inc. located in Wilmington, Del.), sequestering agents, viscosity modifiers, surface-active agents, chelating agents, resins, water, and combinations thereof.

The composite color disclosed herein may be formed on any suitable substrate upon which the first and second inks may be printed. In an embodiment, the substrate is plain paper or photopaper. However, it is to be understood that many different materials may be employed in connection with the substrate, including, but not limited to those made from paper, polymeric materials (non-limiting examples of which include polyester white film or polyester transparent film), photo paper (non-limiting examples of which include polyethylene or polypropylene extruded on one or both sides of paper), metals and/or mixtures thereof. An example of a suitable metal material includes, but is not limited to a metal in foil form made from, for example, at least one of aluminum, silver, tin, copper, alloys thereof, and/or mixtures thereof. In an embodiment, the substrate has a thickness along substantially the entire length ranging between about 0.025 mm and about 0.5 mm.

In an embodiment of the method of forming the composite color, the first colored ink is established on at least a portion of the substrate, and the second colored ink is established on at least a portion of the first colored ink. It is the combination of the colors of the first and second inks that forms the composite color.

It is to be understood that the amount of first colored ink and second colored ink used may depend, at least in part, on the desired hue for the composite color. In a non-limiting example embodiment, the ratio of first to second ink ranges from about 0.001:0.99 to about 0.99:0.001. As such, any desirable amount of the first and second colored inks may be used to form the composite color.

The inks may be established (e.g., printed) substantially simultaneously or sequentially. Furthermore, any suitable printing method may be used to establish the inks to form the composite color. Non-limiting examples of such printing methods include thermal inkjet printing, piezoelectric inkjet printing, acoustic printing, gravure printing, offset printing, flexographic printing, screen printing, or the like, or combinations thereof.

Some non-limiting examples of the composite colors that may be formed include shades of red, blue, and green. A composite red may be formed using magenta and yellow inks; a composite blue may be formed using magenta and cyan inks; and a composite green may be formed using yellow and cyan inks.

To further illustrate embodiment(s) of the present disclosure, various examples are given herein. It is to be understood that these examples are provided for illustrative purposes and are not to be construed as limiting the scope of the disclosed embodiment(s).

EXAMPLE 1

Composite colors were printed on plain paper using magenta and yellow colored inks. The colored inks were prepared with magenta or yellow pigment particles and polymeric dispersant/stabilizing groups. A yellow colored ink having anionic stabilizing groups ("anionic yellow 1"), a yellow colored ink having cationic stabilizing groups ("cationic yellow 1"), a magenta colored ink having anionic stabilizing groups ("anionic magenta 1"), and a magenta colored ink having cationic stabilizing groups ("cationic magenta 1") were prepared. Each of the colored inks was formulated with the ink vehicle shown in Table 1.

TABLE 1

| Ink Vehicle Formulation | |
|---|---|
| Ingredients | Percentage of Ingredient |
| Pigment | 4.0 |
| Diethylene Glycol | 2.0 |
| 1,2-hexanediol | 4.0 |
| Glycerol | 5.0 |
| low molecular weight glyceryl polyoxyethyl ether | 5.0 |
| Nonylphenol Ethoxylate | 1.0 |
| nonionic fluorosurfactant | 0.2 |
| Water | Balance |

The inks were used to fill thermal inkjet pens and were printed on plain paper using a Hewlett Packard Deskjet 6540 printer. The printed samples were allowed to dry at an ambient temperature. As previously stated, "Lightness," as the term is used herein, refers to the $L^*$ value measured in CIELAB color space. For example, in the CIELAB color space (which allows the specification of color perceptions in terms of a three-dimensional space), the lightness, expressed as $L^*$, extends from zero (black) to 100 (white). It is to be understood that the attributes described herein may be described using other measurement systems (e.g., Munsell) that depict the color stimuli and performance characteristics discussed herein. Additionally, the terms $a^*$ and $b^*$, together, define the hue, where $a^*$ ranges from a negative number (green) to a positive number (red), and $b^*$ ranges from a negative number (blue) to a positive number (yellow). Alternative terms such as $h^*$ (hue angle) and $C^*$ (chroma) may also be used to describe a given color. Lightness ($L^*$), ($a^*$), and ($b^*$) were measured, and color richness or saturation was calculated as $C^*/L^*$.

Tables 2-5 show the color richness of composite red colors formed using anionic yellow 1 ink with cationic magenta 1 ink (Tables 2 and 3), anionic yellow 1 ink with anionic magenta 1 ink (Table 4, comparative example 1), and cationic yellow 1 ink with cationic magenta 1 ink (Table 5, comparative example 2).

TABLE 2

| Composite Red Formed with Anionic Yellow Ink and Cationic Magenta Ink | | |
|---|---|---|
| Color | Charge | $C^*/L^*$ |
| Yellow | Anionic | 0.69 |
| Magenta | Cationic | 0.90 |
| Composite Red | | 0.90 |

TABLE 3

Composite Red Formed with Anionic Yellow Ink and Cationic Magenta Ink

| Color | Charge | C*/L* |
|---|---|---|
| Yellow | Anionic | 0.69 |
| Magenta | Cationic | 0.95 |
| Composite Red | | 0.88 |

TABLE 4

Composite Red Formed with Anionic Yellow Ink and Anionic Magenta Ink

| Color | Charge | C*/L* |
|---|---|---|
| Yellow | Anionic | 0.69 |
| Magenta | Anionic | 0.81 |
| Composite Red | | 0.72 |

TABLE 5

Composite Red Formed with Cationic Yellow Ink and Cationic Magenta Ink

| Color | Charge | C*/L* |
|---|---|---|
| Yellow | Cationic | 0.77 |
| Magenta | Cationic | 0.90 |
| Composite Red | | 0.73 |

The above results show that a composite red color obtained with oppositely charged magenta and yellow inks printed on plain paper exhibits increased color richness when compared with composite red colors obtained with magenta and yellow inks having the same charge printed on plain paper.

EXAMPLE 2

Composite red colors were printed on different papers using magenta and yellow colored inks. Composite blue colors were printed on different papers using magenta and cyan colored inks. The colored inks were respectively prepared with pigment loads of about 5% magenta, 5% yellow, or 4% cyan, and polymeric dispersant/stabilizing groups.

A magenta colored ink having anionic stabilizing groups ("anionic magenta 2"), a magenta colored ink having cationic stabilizing groups ("cationic magenta 2"), a cyan colored ink having anionic stabilizing groups ("anionic cyan"), a cyan colored ink having cationic stabilizing groups ("cationic cyan"), a yellow colored ink having anionic stabilizing groups ("anionic yellow 2"), and a yellow colored ink having cationic stabilizing groups ("cationic yellow 2") were prepared. Each of the colored inks was formulated with an ink vehicle similar to that shown in Table 1 of Example 1, with the exception of the higher pigment loads (5% magenta, 5% yellow, or 4% cyan).

The inks were used to fill thermal inkjet pens and were printed on Hewlett Packard printing paper and on nine other types of paper. Table 6 shows the saturation of composite red colors formed using anionic yellow 2 ink with anionic magenta 2 ink (comparative example 3), anionic magenta 2 ink with cationic yellow 2 ink, and cationic magenta 2 ink with anionic yellow 2 ink. Table 7 shows the saturation of composite blue colors formed using anionic magenta 2 ink with anionic cyan ink (comparative example 4), anionic magenta 2 ink with cationic cyan ink, and cationic magenta 2 ink and anionic cyan ink. The saturation results of the composite colors on the HP printing paper, and the average of the saturation results for the nine other papers are shown.

TABLE 6

Composite Reds

| Media | Inks Used to form Composite Red | Saturation |
|---|---|---|
| HP Printing Paper | Anionic magenta 2 and anionic yellow 2 | 0.85 |
| Average of Nine Papers | Anionic magenta 2 and anionic yellow 2 | 0.93 |
| HP Printing Paper | Anionic magenta 2 and cationic yellow 2 | 1.04 |
| Average of Nine Papers | Anionic magenta 2 and cationic yellow 2 | 1.03 |
| HP Printing Paper | Cationic magenta 2 and anionic yellow 2 | 1.04 |
| Average of Nine Papers | Cationic magenta 2 and anionic yellow 2 | 1.10 |

TABLE 7

Composite Blues

| Media | Inks Used to form Composite Blue | Saturation |
|---|---|---|
| HP Printing Paper | Anionic magenta 2 and anionic cyan | 0.87 |
| Average of Nine Papers | Anionic magenta 2 and anionic cyan | 0.98 |
| HP Printing Paper | Anionic magenta 2 and cationic cyan | 1.27 |
| Average of Nine Papers | Anionic magenta 2 and cationic cyan | 1.28 |
| HP Printing Paper | Cationic magenta 2 and anionic cyan | 1.24 |
| Average of Nine Papers | Cationic magenta 2 and anionic cyan | 1.22 |

The above results show that a composite red color and a composite blue color obtained with oppositely charged inks exhibit increased saturation, and thus enhanced color richness, when compared with composite red and blue colors obtained with inks having the same charge.

Embodiment(s) of the color composites disclosed herein advantageously have increased color richness when printed on a variety of media. Furthermore, the composite colors may be achieved without additional fixer fluids and pen chambers.

While several embodiments have been described in detail, it will be apparent to those skilled in the art that the disclosed embodiments may be modified. Therefore, the foregoing description is to be considered exemplary rather than limiting.

What is claimed is:

1. A composite color, comprising:
    a first colored ink including amphoteric pigment particles either formulated at a basic pH so that a surface of the pigment particles carries a net negative charge or formulated at an acidic pH so that a surface of the pigment particles carries a net positive charge; and
    a second colored ink including amphoteric pigment particles either formulated at an acidic pH so that a surface of each of the pigment particles carries a net positive charge or formulated at a basic pH so that a surface of the pigment particles carries a net negative charge, the first colored ink exhibiting a color that is different from that exhibited by the second colored ink;

each of the first and second colored inks including a molecule having one group capable of being ionized to carry the net negative charge and an other group capable of being ionized to carry the net positive charge;

wherein the first colored ink and the second colored ink have opposite charges;

and wherein the composite color exhibits enhanced color richness when printed on a substrate.

2. The composite color as defined in claim 1 wherein the one group capable of being ionized to carry the net negative charge is selected from carboxylic acids, carbonic acids, carbamic acids, sulfonic acids, sulfinic acids, boronic acids, phosphoric acids, phosphonic acids, phenols, naphthols, and combinations thereof.

3. The composite color as defined in claim 1 wherein the other group capable of being ionized to carry the net positive charge is selected from primary amines, secondary amines, tertiary amines, imines, imidazoles, guanidines, nitrogen containing heterocycles, and combinations thereof.

4. The composite color as defined in claim 1 wherein the first colored ink is selected from one of cyan, magenta or yellow, and wherein the second colored ink is selected from an other of yellow, magenta or cyan.

5. The composite color as defined in claim 1 wherein each of the first and second colored inks exhibits a color other than black.

6. A method of making a composite color, comprising:

printing a first colored ink on at least a portion of a substrate, the first colored ink including amphoteric pigment particles either formulated at a basic pH so that a surface of the pigment particles carries a net negative charge or formulated at an acidic pH so that a surface of the pigment particles carries a net positive charge; and printing a second colored ink on at least a portion of the first colored ink, thereby forming the composite color having enhanced color richness, the second colored ink including amphoteric pigment particles either formulated at an acidic pH so that a surface of each of the pigment particles carries a net positive charge or formulated at a basic pH so that a surface of the pigment particles carries a net negative charge;

each of the first and second colored inks including a molecule having one group capable of being ionized to carry the net negative charge and an other group capable of being ionized to carry the net positive charge;

wherein the first colored ink exhibits a color that is different from that exhibited by the second colored ink;

and wherein the first colored ink and the second colored ink have opposite charges.

7. The method as defined in claim 6 wherein the printing is accomplished by thermal inkjet printing, piezoelectric inkjet printing, acoustic printing, gravure printing, offset printing, flexographic printing, screen printing, or combinations thereof.

8. The method as defined in claim 6 wherein printing the first colored ink and the second colored ink occurs substantially simultaneously or sequentially.

9. The method as defined in claim 6 wherein one of the first colored ink or the second colored ink is formulated at the basic pH by ionizing, to its anion, the one group of the molecule present in the first colored ink, and wherein an other of the second colored ink or the first colored ink is formulated at the acidic pH by ionizing, to its cation, the one group of the molecule present in the second colored ink.

10. The method as defined in claim 9 wherein the molecule present in the first colored ink is covalently attached or physically adsorbed to the pigment particles of the first colored ink; and wherein the molecule present in the second colored ink is covalently attached or physically adsorbed to the pigment particles of the second colored ink.

11. The method as defined in claim 6 wherein the first colored ink is selected from one of cyan, magenta or yellow, and wherein the second colored ink is selected from an other of yellow, magenta, or cyan.

12. An ink system, comprising:

a substrate; and a composite color established on at least a portion of the substrate, the composite color exhibiting enhanced color richness, and including:

a first colored ink including amphoteric pigment particles stabilized by a molecule containing at least one group that is ionized to carry a net negative charge and containing at least one group that is ionized to carry a net positive charge; and a second colored ink including amphoteric pigment particles stabilized by a molecule containing at least one group that is ionized to carry a net positive charge and containing at least one group that is ionized to carry a net negative charge, the first colored ink exhibiting a color that is different from that exhibited by the second colored ink;

wherein the first colored ink and the second colored ink have opposite charges.

13. The ink system as defined in claim 12 wherein the molecule present in the first colored ink is covalently attached or physically adsorbed to the pigment particles of the first colored ink; and wherein the molecule present in the second colored ink is covalently attached or physically adsorbed to the pigment particles of the second colored ink.

14. The ink system as defined in claim 12 wherein the composite color is red, and wherein the first colored ink is selected from one of magenta or yellow, and wherein the second colored ink is selected from an other of yellow or magenta.

15. The ink system as defined in claim 12 wherein the composite color is blue, and wherein the first colored ink is selected from one of magenta or cyan, and wherein the second colored ink is selected from an other of cyan or magenta.

16. The ink system as defined in claim 12 wherein the composite color is green, and wherein the first colored ink is selected from one of cyan or yellow, and wherein the second colored ink is selected from an other of yellow or cyan.

17. The composite color as defined in claim 1 wherein the molecule in each of the first and second colored inks includes a carboxylic acid functional group as the one group capable of being ionized to carry the net negative charge and a primary amine functional group as the other group capable of being ionized to carry the net positive charge.

* * * * *